United States Patent [19]

Funato

[11] Patent Number: 4,637,679

[45] Date of Patent: Jan. 20, 1987

[54] MULTIBEAM PHOTOSCANNER

[75] Inventor: Hiroyoshi Funato, Chigasaki, Japan

[73] Assignee: Ricoh Company, Ltd., Tokyo, Japan

[21] Appl. No.: 513,091

[22] Filed: Jul. 12, 1983

[30] Foreign Application Priority Data

Jul. 14, 1982 [JP] Japan ................... 57-121237

[51] Int. Cl.$^4$ .................. G02B 26/10; G02B 27/10
[52] U.S. Cl. ........................ 350/6.5; 350/3.71; 350/174
[58] Field of Search ............ 350/6.5, 6.8, 3.71, 350/174

[56] References Cited

U.S. PATENT DOCUMENTS

| | | | |
|---|---|---|---|
| 4,224,509 | 9/1980 | Cheng | 350/3.71 |
| 4,251,129 | 2/1981 | Suzuki et al. | 350/6.8 |
| 4,423,426 | 12/1983 | Kitamura | 350/6.8 |
| 4,525,024 | 6/1985 | Tatsuno et al. | 350/6.5 |

Primary Examiner—John K. Corbin
Assistant Examiner—Rebecca D. Gass
Attorney, Agent, or Firm—Oblon, Fisher, Spivak, McClelland, & Maier

[57] ABSTRACT

In a laser printer or the like, for the purpose of increasing a recording speed, the number of revolutions of a laser beam deflector is not increased but a plurality of scanning lines are simultaneously scanned. To this end, a plurality of laser beams with an angle of incidence slightly varied are simultaneously incident upon one and the same laser beam deflector. In the event that places for installation of a plurality of light sources are hindered each other by other light sources, light sources different in polarization surface from each other are used, and when beams are combined by means of a polarization beam combiner, a combined beam which is different in angle of emergence through a fine angle each other can be obtained without loss of light.

4 Claims, 5 Drawing Figures

MULTIBEAM PHOTOSCANNER

BACKGROUND OF THE INVENTION

1. Field of the Invention

The present invention relates to a scanner for scanning a laser beam, and particularly to a scanner which can simultaneously scan a plurality of laser beams.

2. Description of the Prior Art

It is well known in a laser printer, a laser COM and the like that a photoscanning and recording device is used in which a semiconductor laser is used as a light source and a laser beam is scanned on a recording surface by a rotary polygonal mirror, a hologram disc or the like. One method of increasing a recording speed in the device of this kind is to increase the rotational speed of a laser beam deflector such as the rotary polygonal mirror, the hologram or the like to effect high speed scanning. However, if high rotational speed is employed, bearings used must be those such as an air bearing, a magnetic bearing or the like which are high in degree and expensive, resulting in a higher cost of apparatus. Furthermore, output of laser is short depending on the case.

SUMMARY OF THE INVENTION

It is an object of the present invention to provide a photoscanner in which a plurality of laser beams are brought into incidence upon one and the same laser beam deflector with an angle of incidence slightly varied, and said plurality of beams can be respectively simultaneously scanned on a plurality of scanning lines to thereby substantially increase the scanning speed without increasing the number of revolutions of the laser beam deflector.

DETAILED DESCRIPTION OF THE PREFERRED EMBODIMENT

Figure 1:
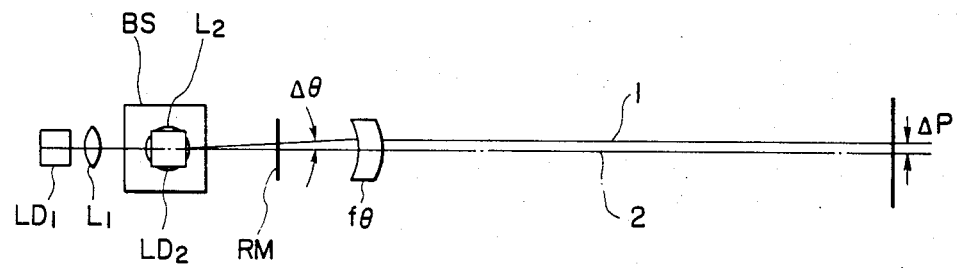
FIGS. 1 and 2 are respectively views showing an optical arrangement in a sub-scanning direction and a main scanning direction of embodiments which use a rotary polygonal mirror in the photo scanner in accordance with the present invention.
Figure 2:
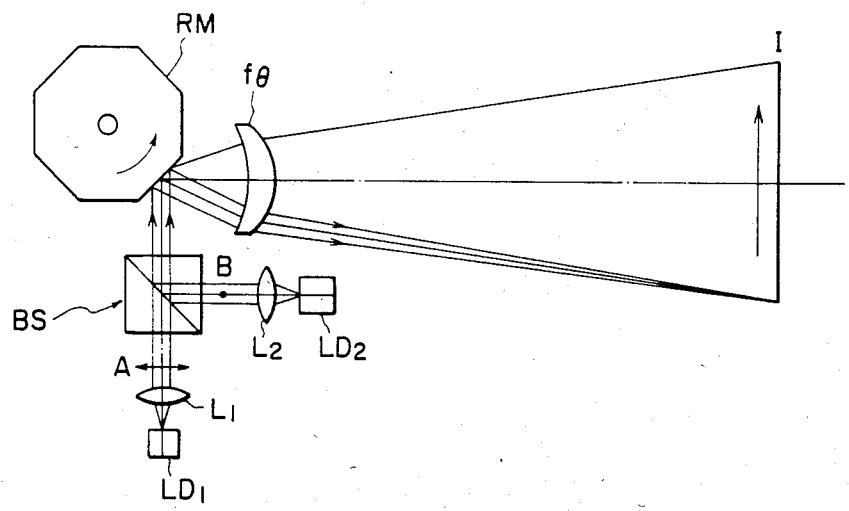

FIGS. 1 and 2 show an embodiment which uses a rotary polygonal mirror as a laser beam deflector to simultaneously scan two beams. A beam is reflected by a rotary polygonal mirror RM and a spot is formed on a scanning surface I by an fθ lens and the beam is scanned in a direction within a paper surface of FIG. 2 on the scanning surface I by rotation of the polygonal mirror RM. In the present invention, in a light source, two semiconductor lasers LD1 and LD2 are arranged so that joining surfaces thereof may be displaced perpendicularly. That is, when an arrangement is made so that the joining surface of the laser LD1 is parallel to the paper surface in FIG. 2 whereas the joining surface of the laser LD2 is vertical to the paper surface, a polarization vector of emerged light from the laser is parallel to the paper surface as shown by the arrow A for the laser LD1 and is vertical to the paper surface as in B for the laser LD2.

Emerged lights from the lasers LD1 and LD2 are formed into parallel light flux by collimation lenses $L_1$, $L_2$, respectively and put into a polarization beam combiner BS. Since both light fluxes are polarized vertically to each other, the beam from the laser LD1 permeates by nearly 100% and the beam from the laser LD2 is reflected by nearly 100%. Thus, two beams are combined as a beam in nearly the same direction without substantial loss, and the beam is subjected to polarization scanning by the rotary polygonal mirror.

To scan both said two beams on the respective scanning lines, it is necessary to make spots at an interval of a scanning line pitch $\Delta P$ in a main scanning direction and in a vertical direction as can be seen in FIG. 1 on the scanning surface I. For this purpose, the emergence direction of the lasers LD1 and LD2 is displaced through an angle $\Delta\theta$ in a surface including a rotating axis of the polygonal mirror.

The angle $\Delta\theta$ can be set to $$\Delta\theta = \Delta P/f \tag{1}$$

where $\Delta P$ is the scanning line pitch, and f is the focal distance of the fθ lens.

When each of the semiconductor lasers LD1 and LD2 are independently modulated by record signals of the scanning line of an odd number and an even number, respectively, it is possible to simultaneously write information on two scanning lines, and therefore, the recording speed equal to that obtained by doubling the number of revolutions of the rotary polygonal mirror. Likewise, it is possible to simultaneously scan more than two beams.

Figure 3:
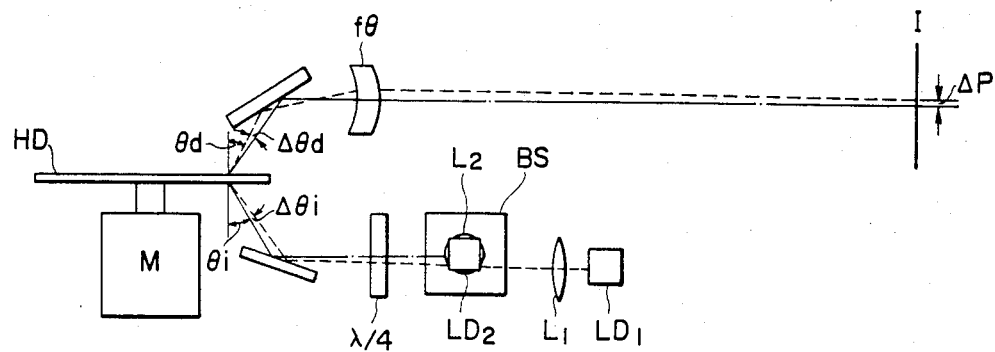
FIGS. 3 and 4 are likewise views showing an optical arrangement in a sub-scanning direction and a main scanning direction of embodiments which use a hologram disc.
Figure 4:
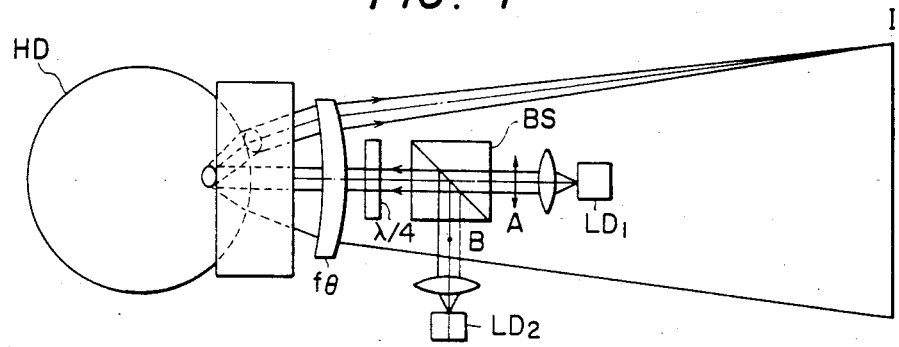

FIGS. 3 and 4 show an embodiment in which a hologram disc is used as a laser beam deflector.

This embodiment is the same as the previous embodiment in that beams from two lasers LD1 and LD2 polarized vertically to each other are combined into a beam in nearly the same direction by a polarization beam combiner BS without substantial loss. These parallel beams are formed into parallel beams diffracted and deflected by means of a rotating hologram disc HD, which beams are focused at the scanning surface I by means of an fθ lens fθ for scanning at uniform speed.

At this time, to simultaneously scan a plurality of scanning lines, each of beams have to be focused at an interval of a scanning line pitch $\Delta P$ in a main scanning direction and in a vertical direction in the scanning surface, similarly to the previous embodiment, and an angle of incidence of the beam to the laser beam deflector is slightly displaced.

For example, the angle of incidence of the beam from the laser LD2 is displaced through $\theta_i$, and the angle of incidence of the beam from the laser LD1 is displaced therefrom through $\Delta\theta$. Let d represent the pitch of a hologram grid and let $\lambda$ represent the wavelength of laser. The angle of diffraction of the beam from the laser LD2 is displaced through $\theta d$ and the angle of diffraction of the beam from the laser LD1 is displaced therefrom through $\Delta\theta d$ (these angles of diffraction indicate values when the light is scanning the central portion of the scanning surface).

A grid equation of diffraction to the beam from the laser LD2 is given by $$\sin\theta_i + \sin\theta d = \lambda/d \tag{2}$$

A grid equation of diffraction to the beam from the laser LD1 is given by $$\sin(\theta i + \Delta\theta i) + \sin(\theta d + \Delta\theta d) = \lambda/d \quad (3)$$

and assuming that $\Delta\theta i$ and $\Delta\theta d$ are small from Equation (3), then, $$\sin\theta i + \Delta\theta i \cos\theta i + \sin\theta d + \Delta\theta d \cos\theta d \approx \lambda/d$$

From Equations (4) and (1), $$\Delta\theta d = -(\cos\theta i/\cos\theta d)\Delta\theta i \quad (5)$$

is obtained. Since two diffracted beams are incident upon the $f\theta$ lens with the angle indicated by Equation (5) displaced, a deviation of a focused point on the scanning surface is $f|\Delta\theta d|$. This deviation may well be equal to the scanning line pitch P. Then, the following is obtained.

$$\Delta P = f|\Delta\theta d|$$

$$\therefore \Delta\theta i = (\cos\theta d/\cos\theta i)\cdot(\Delta P/f) \quad (6)$$

Accordingly, positions of two lasers can be set so that the angle of incidence is displaced through $\Delta\theta i$.

Figure 5:
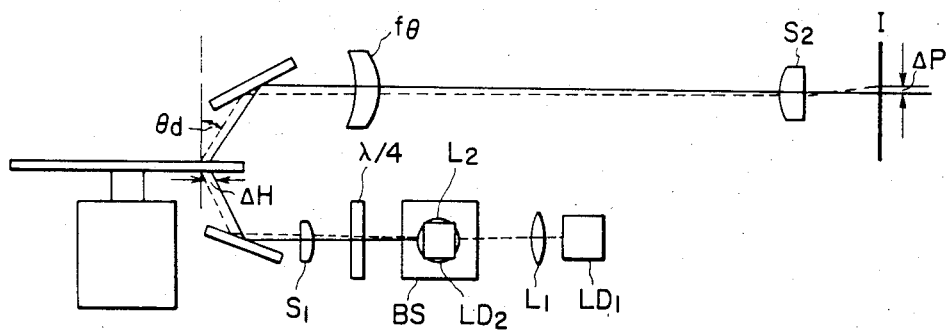
FIG. 5 is a view showing an optical arrangement in a sub-scanning direction of another embodiment which uses a hologram disc.

FIG. 5 shows another embodiment which uses a hologram disc HD. After two laser beams have been combined by means of a polarization beam combiner, said beam is converted by a first cylindrical lens S1 into a beam which is different in focused condition between the radial direction and the circumferential direction of the disc HD and incident upon the disc. The beam diffracted and deflected by the hologram is focused on the scanning surface via the $f\theta$ lens and the cylindrical lens S2. It is designed so that the main scanning direction shown in FIG. 5, the hologram surface in a vertical plane and the scanning surface are in the geometrically optical conjugate relation with respect to the combined optical system composed of of the $f\theta$ lens and the cylindrical lens S2 to prevent unevenness of pitch caused by the hologram disc.

To scan two scanning lines simultaneously, the beams from two lasers LD1 and LD2 are made incident at an interval of $\Delta H$ each other in the hologram surface. In FIG. 5, let M represent the magnification at which the hologram surface is focused at the scanning surface, then the deviation $\Delta H$ of the incident beam is given by $$\Delta H = \Delta P/M \cos\theta d \quad (7)$$

The incident position of the incident beam can be set so as to fulfill Equation (7).

In the photo scanner which uses the aforesaid two hologram discs as a laser beam deflector, there occurs a problem in that polarizing directions of the beams incident upon the holograms are perpendicular to each other, and therefore, the efficiency of diffraction is different from one beam to the other. The efficiency of diffraction of the hologram varies with the polarizing direction, and the efficiency of diffraction is maximum at S polarization wherein the oscillating direction of light is parallel to the grid and is minimum at P polarization wherein the oscillating direction of light is at a right angle.

In the embodiments shown in FIGS. 4 and 5, the beam of the laser LD1 is incident at S polarization and the beam of the laser LD2 is incident at P polarization, and therefore, the efficiency of diffraction is high for the beam of LD1 whereas is low for the beam of LD2. Because of this, both the beams in the scanning surface become unbalanced in intensity.

Therefore, if a $\lambda/4$ plate is disposed in the beam emerged from the polarization beam combiner, as shown in FIGS. 3, 4 and 5, to change both beams into a circular polarization, there occurs no difference in efficiency of diffraction and occurs no unbalance in intensity of beam on the scanning surface.

As described above, in the multibeam photoscanner of the present invention, substantial high speed scanning can be achieved without increasing the number of revolutions of the laser beam deflector, and therefore, an inexpensive high speed scanner can be obtained. In addition, a polarization beam combiner is used to combine beams, and therefore, the present scanner has great advantages in that high efficiency can be obtained without useless loss of light.

What is claimed is:

1. A multibeam photoscanner which comprises a laser light source, a laser beam deflector for deflecting and scanning beams from said light source, and a focusing optical system for focusing the deflected beams on a scanning surface, characterized in that said light source comprises a plurality of light sources wherein polarizing directions are different and an angle of incidence upon said deflector is slightly different, and the beams from said plurality of light sources are combined by means of a polarization beam combiner to simultaneously scan a plurality of different scanning lines in one and the same image plane.

2. A multibeam photoscanner according to claim 1, wherein said laser beam deflector comprises a hologram disc, and a ¼ wavelength plate is arranged between said polarization beam combiner and said hologram.

3. A multibeam photoscanner, comprising:
   a first light source producing a first light beam which is polarized in a first direction;
   a second light source producing a second light beam which is polarized in a second direction perpendicular to said first direction;
   a polarization beam combiner receiving and combining said first beam and said second beam to produce a combined beam having light polarized in first and second perpendicular directions, said beam combiner being positioned so that the light polarized in a first direction is directed at a slightly different angle to the light polarized in the second direction;
   deflecting means for deflecting said combined beam;
   focusing means for focusing said deflected beam onto a scanning surface to simultaneously scan a plurality of different scanning lines in one and the same image plane.

4. A multibeam photoscanner according to claim 3 further comprising:
   a quarter wave plate between said beam combiner and said deflecting means.

* * * * *